No. 847,071. PATENTED MAR. 12, 1907.
J. P. HERBERT & H. S. & E. J. PRICE.
POTATO DIGGER AND ASSORTER.
APPLICATION FILED OCT. 27, 1905.
3 SHEETS—SHEET 1.
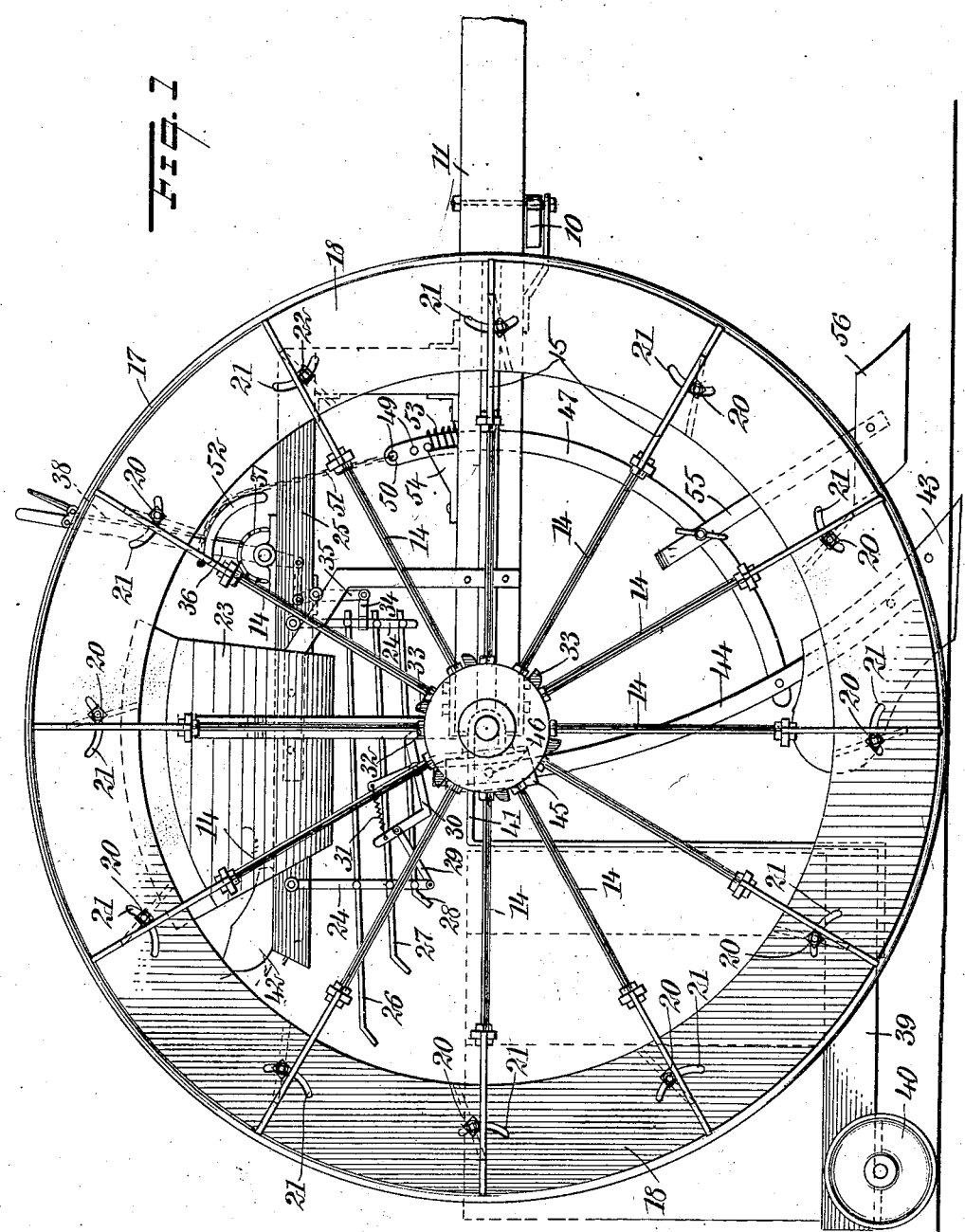
WITNESSES:
INVENTORS
James P. Herbert
Henry S. Price
Edward J. Price
BY
ATTORNEYS

No. 847,071. PATENTED MAR. 12, 1907.
J. P. HERBERT & H. S. & E. J. PRICE.
POTATO DIGGER AND ASSORTER.
APPLICATION FILED OCT. 27, 1905.
3 SHEETS—SHEET 2.
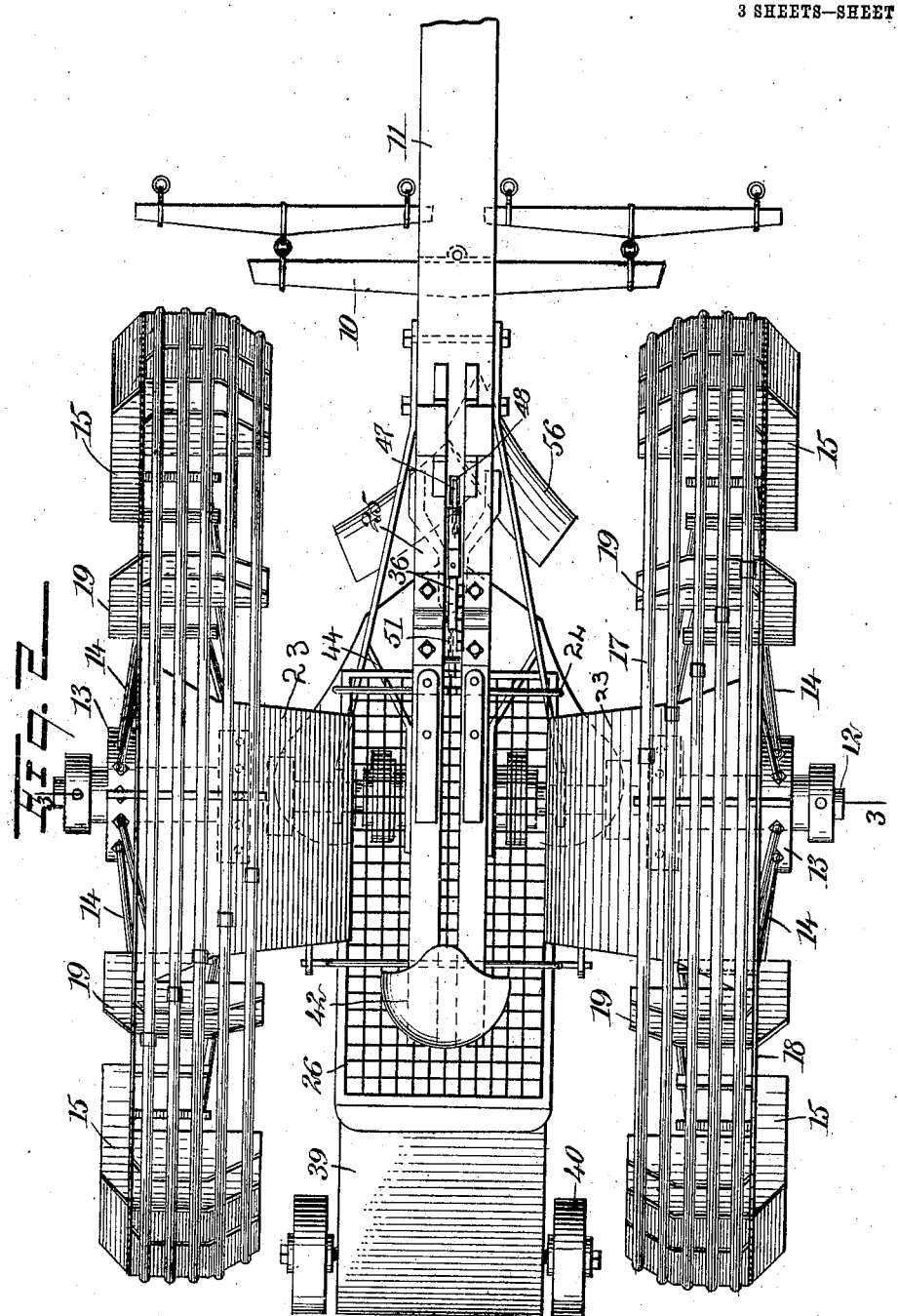
WITNESSES:
INVENTORS
James P. Herbert
Henry S. Price
Edward J. Price
BY
ATTORNEYS No. 847,071. PATENTED MAR. 12, 1907.
J. P. HERBERT & H. S. & E. J. PRICE.
POTATO DIGGER AND ASSORTER.
APPLICATION FILED OCT. 27, 1905.
3 SHEETS—SHEET 3.
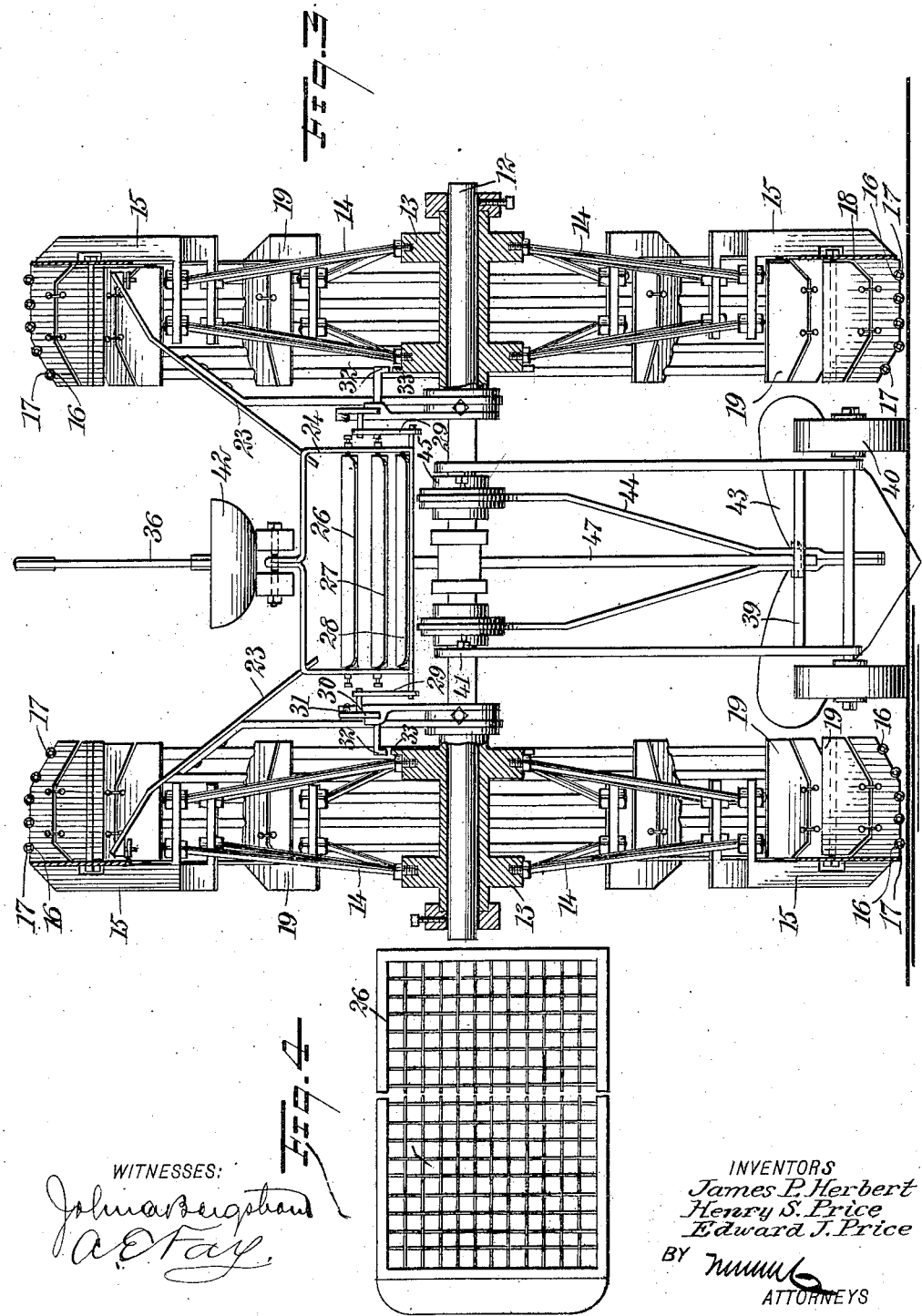
WITNESSES:
INVENTORS
James P. Herbert
Henry S. Price
Edward J. Price
BY
ATTORNEYS

UNITED STATES PATENT OFFICE.

JAMES P. HERBERT, HENRY S. PRICE, AND EDWARD J. PRICE, OF NEW BRUNSWICK, NEW JERSEY.

POTATO DIGGER AND ASSORTER.

No. 847,071.        Specification of Letters Patent.        Patented March 12, 1907.

Application filed October 27, 1905. Serial No. 284,651.

*To all whom it may concern:*

Be it known that we, JAMES P. HERBERT, HENRY S. PRICE, and EDWARD J. PRICE, all citizens of the United States, and residents of New Brunswick, in the county of Middlesex and State of New Jersey, have invented a new and Improved Potato Digger and Assorter, of which the following is a full, clear, and exact description.

Our invention relates to an agricultural implement which is capable of use for harvesting several kinds of roots and assorting them, but is particularly adapted for digging and assorting potatoes.

The principal objects of the invention are to provide a vehicle which is adapted to be drawn by horses or any kind of motive power with means for taking up potatoes or other roots on the wheels of the vehicle, delivering them to a series of assorting-screens on the body of the vehicle, and finally discharging them into a series of receptacles arranged at a convenient place for receiving the different sizes of potatoes.

The invention also comprises means for cutting the vines in advance of the digging operation and for controlling the operation of the various parts of the machine.

Further objects of the invention will appear below.

Reference is to be had to the accompanying drawings, forming a part of this specification, in which similar characters of reference indicate corresponding parts in all the figures.

Figure 1 is a side elevation of a vehicle constructed in accordance with the principle of our invention. Fig. 2 is a plan of the same. Fig. 3 is a sectional view on the line 3 3 of Fig. 2, and Fig. 4 is a plan of a portion of the assorting device.

For the purpose of efficiently applying the power of the horses to the vehicle we have shown the whiffletrees as being connected with the plate 10 on the lower side of the pole 11. Connected with this pole is a main shaft 12, on which are journaled a pair of hubs 13, which freely turn upon the shaft. On these hubs are mounted spokes 14, which connect with a series of plates 15, mounted radially and beveled on the inside. Each of these plates is provided with a series of notches 16 upon its outer surface. These notches are designed for receiving a rim comprising a series of tires 17, preferably in the form of endless tubes. It will be seen that the features so far described constitute the wheels of the vehicle and that the tubes 17 being spaced apart and the inside ones being on the beveled portions of the plate the rims are of a smaller diameter on the inside than on the outside and furnish a kind of rotating basket for receiving potatoes or other roots and sifting the dirt therefrom in the ordinary rotation of the wheel. The outside of each of the wheels above described is formed by a circular plate 18, and said wheels are adjustable on their shaft either inward or outward, as occasion may demand, and they are held by means of suitable set-screws.

In order to provide for raising the potatoes as the wheels rotate, we locate a series of vanes 19 within each wheel. These vanes are pivotally connected with the plates 15, which support the tubes, and each one is provided with a longitudinal rod 20. Each rod is adapted to extend through a curved slot 21 in the plate 18 and is secured in adjusted position in said slot by a nut 22. The purpose of this construction is to permit the fixing of the inclination of these plates in such manner as to insure that the potatoes will rise with the wheel and be discharged when they reach the top thereof. It will be seen that these vanes being spaced apart form a series of receptacles along the wheel for the purpose of receiving and transferring the potatoes from a position near the ground to a more elevated position. When the potatoes reach the upper part of the wheel, they are designed to be discharged onto a chute 23 on each side of the machine. These two chutes direct them downwardly into an assorting device. This assorting device in its preferred form consists of a pair of rods 24, pivotally suspended from a frame 25, which is fixedly mounted on the pole or other substantial part of the vehicle.

Pivotally connected with the two rods are a series of screens 26, 27, and 28. These screens are of different mesh, the top one being the coarser. When the potatoes fall upon them, they are caused to be separated in accordance with the well-known principle of screens of this character and will be discharged from the rear ends of the screens. In order to accomplish this result and to effectively assort the potatoes, the screens are inclined downwardly at the rear and are provided with means for agitating them. This means is represented by a link 29, connected with one of the rods 24 and with a lever 30, pivoted on the stationary part of the device. This lever is normally held in a certain position by a spring 31 and is provided with a projection 32, adapted to be engaged by a series of teeth 33 on the hub 13. This construction can be duplicated on the two sides of the machine, or all of the motion can be received from one side. For the purpose of throwing this part of the mechanism out of operation when desired we have shown one of the rods 24 as connected by a link 34 with a lever 35, pivoted on the frame 25 and connected with an operating-lever 36. This operating-lever is provided with a rack 37 and a spring-dog 38, by means of which it can be held in any desired position. When this lever is turned to one extreme position, it will move the assorting device rearwardly and turn the lever 30 on its pivot, so that the projection 32 thereof will be out of reach of the teeth 33. When this device is in operation, however, it will deliver a plurality of sizes of potatoes from the rear ends of the several screens. In order to keep these sizes separate, we have shown a truck 39, having a pair of wheels 40 and a hook 41. This hook is adapted to engage the main shaft of the vehicle, which supports the front end of the truck. On the truck are placed receptacles in the proper position to receive potatoes from the several screens. We have shown a seat 42 for the driver as mounted on the frame 25 within reach of the lever 36.

In order to provide for digging the potatoes and throwing them into the wheels, we have shown a plow 43, mounted on a frame 44, which is adjustably supported by a bracket 45. This bracket is mounted on the shaft 12, and the plow is connected therewith by a pin 46 in any adjusted position. It will be observed that as the bracket is rotatably mounted on the shaft the plow is free to swing about the shaft as a pivot. For the purpose of holding the plow in operative position a curved bar 47 is connected with the lower end of the support 44. This bar extends through a slot 48 in the pole 11 and is provided with a plurality of perforations 49 above the pole. These perforations are designed to receive a pin 50, which is connected with a chain 51, passing over a segment 52, mounted on the lever 36. A spring 53 is connected with the bar 47 and rests on the top of the pole. The purpose of this is to permit the plow to yield slightly when it meets with any obstruction. The connection of the bar 47 with the lever 36 is made for the purpose of permitting the plow to be entirely raised when necessary—as, for example, in turning. A plate 54 is mounted on the pole near the bar 47 to serve as a rest for the pin in the bar to hold the bar and plow in elevated position. On this bar we have also mounted a frame 55, carrying a cutter 56 for the purpose of cutting the vines in advance of the digging operation.

The operation of the machine is very simple and has, in effect, been described in the course of the description of the elements illustrated in the drawings. As the vehicle proceeds along a row the plow throws the potatoes and dirt into the wheels, the dirt passing through the spaces between the tubes and the potatoes being left in the compartments between the several plates 19. By the continued rotation of the wheels the potatoes are elevated and pass down the chutes 23 into the assorting device, which being agitated by the teeth 33 throws the different sizes of potatoes into the several receptacles on the truck 39. If it is desired to move the vehicle without performing the digging operation, the lever 36 is moved to one extreme position and the plow is then elevated out of reach of the ground, while the projection 32 is removed from engagement with the teeth 33. Also by the operation of the spring 53 the striking of a small stone or similar obstruction will simply cause the plow to yield without resulting in any damage to the device. By placing the bar 10 below the pole the most effective application of power from the draft-animals is secured.

Having thus described our invention, we claim as new and desire to secure by Letters Patent—

1. A harvesting-machine comprising a wheel having a rim consisting of a series of tires spaced apart, said rim being of smaller diameter on the inside than at the center.

2. A harvesting-machine, comprising a vehicle having wheels consisting of a series of spaced tires, a plurality of plates mounted within said tires and having depressions for receiving them, and means for holding said plates against the tires.

3. A harvesting-machine, consisting of a vehicle having wheels comprising a series of tires spaced apart, those on the inside being of smaller diameter than those on the outside, means for holding said tires in fixed position, and adjustable vanes mounted within the tires.

4. A harvesting-machine consisting of a vehicle having wheels, comprising a series of tires spaced apart and adjustable vanes mounted within the tires.

5. A harvesting-machine consisting of a vehicle having wheels, each comprising spokes, a series of radial plates fixed to the spokes, a series of tires connected with the plates, and adjustable vanes mounted on the plates.

6. A harvester consisting of a vehicle having wheels each comprising a rotatable hub, spokes connected with the hub, a series of radial plates fixed to the spokes and having depressions in their outer surfaces, a series of circular tires mounted in said depressions, and adjustable vanes mounted on the plates.

7. A harvester consisting of a vehicle having wheels each comprising a rotatable hub, spokes connected with the hub, a series of radial plates fixed to the spokes and having depressions in their outer surfaces, a series of circular tires mounted in said depressions, and adjustable vanes mounted on the plates, said plates being beveled on their inner edges, and the tires mounted on said inner edges being of smaller diameter than those on the outside of the plates.

8. A harvester consisting of a vehicle having wheels each comprising a rotatable hub, spokes connected with the hub, a series of radial plates fixed to the spokes and having depressions in their outer surfaces, a series of circular tubes mounted in said depressions, adjustable vanes mounted on the plates, and a circular plate mounted on the outside of each series of radial plates and constituting the outer boundary of the wheel.

9. A harvesting-machine consisting of a vehicle having wheels comprising a rim having open spaces, said rim constituting a receptacle for the reception of articles to be harvested, a circular plate mounted on the outside of said rim, the said plate having a series of curved slots, and a series of pivoted vanes mounted inside the tire, said vanes having rods projecting through said slots, whereby they may be fixed in adjusted positions.

In testimony whereof we have signed our names to this specification in the presence of two subscribing witnesses.

JAMES P. HERBERT.
HENRY S. PRICE.
EDWARD J. PRICE.

Witnesses:
ELIAS B. RUNYON,
FREDERICK WEIGEL.